United States Patent
Temple et al.

(10) Patent No.: US 7,473,387 B2
(45) Date of Patent: Jan. 6, 2009

(54) METHOD OF AND APPARATUS FOR FORMING NOZZLES

(75) Inventors: Stephen Temple, Cambridge (GB); Philip Thomas Rumsby, Long Hanborough (GB)

(73) Assignee: Xaar Technology Limited, Cambridgeshire (GB)

( * ) Notice: Subject to any disclaimer, the term of this patent is extended or adjusted under 35 U.S.C. 154(b) by 75 days.

(21) Appl. No.: 09/754,486

(22) Filed: Jan. 3, 2001

(65) Prior Publication Data

US 2002/0003320 A1   Jan. 10, 2002

Related U.S. Application Data

(60) Division of application No. 09/096,316, filed on Jun. 11, 1998, now Pat. No. 6,228,311, which is a continuation of application No. PCT/GB97/00126, filed on Jan. 16, 1997.

(30) Foreign Application Priority Data

Jan. 18, 1996  (GB)  ................................. 9601049.1

(51) Int. Cl.
  *B23K 26/00*  (2006.01)
  *B23K 26/42*  (2006.01)
  *H01S 3/00*  (2006.01)

(52) U.S. Cl. .................. 264/400; 264/482; 219/121.71; 359/226

(58) Field of Classification Search ................. 264/400, 264/482; 219/121.7, 121.71, 121.73, 121.76; 357/190–226
See application file for complete search history.

(56) References Cited

U.S. PATENT DOCUMENTS

| 3,586,816 | A |   | 6/1971  | Hagen ......................... 219/121 |
| 4,316,074 | A | * | 2/1982  | Daly ........................ 219/121.7 |
| 4,378,480 | A |   | 3/1983  | Langhans .................... 219/121 |
| 4,682,885 | A |   | 7/1987  | Torigoe ....................... 355/67 |
| 4,683,524 | A |   | 7/1987  | Ohta .......................... 362/268 |
| 4,793,694 | A |   | 12/1988 | Liu ............................ 350/379 |
| 4,851,978 | A |   | 7/1989  | Ichihara ...................... 362/268 |
| 4,950,862 | A |   | 8/1990  | Kajikawa ................. 219/121.7 |
| 5,048,938 | A | * | 9/1991  | Hizny ......................... 359/652 |
| 5,055,653 | A |   | 10/1991 | Funami et al. ......... 219/121.75 |
| 5,063,280 | A |   | 11/1991 | Inagawa et al. .......... 219/121.7 |

(Continued)

FOREIGN PATENT DOCUMENTS

EP           0 066 432 A2    12/1982

(Continued)

OTHER PUBLICATIONS

Welding Handbook, Eighth Edition, vol. 2, American Welding Society, p. 504-505, 1991.

*Primary Examiner*—Matthew J. Daniels
(74) *Attorney, Agent, or Firm*—Marshall, Gerstein & Borun LLP

(57) ABSTRACT

A nozzle in a nozzle plate for an inkjet printhead is formed by directing a laser beam at a nozzle plate. Accurate control of the divergence of the beam is achieved by splitting the beam into sub-beams, each sub-beam having divergence with an origin lying apart from the point at which the beam is created by splitting, and thereafter recombining the sub-beams. Greater accuracy in the taper and inlet shape of the manufactured nozzle is thereby obtained.

5 Claims, 7 Drawing Sheets

U.S. PATENT DOCUMENTS

| | | | |
|---|---|---|---|
| 5,153,773 A | 10/1992 | Muraki et al. | 359/619 |
| 5,170,278 A * | 12/1992 | Wada et al. | 359/212 |
| 5,208,980 A | 5/1993 | Hayes | 29/890.1 |
| 5,263,250 A | 11/1993 | Nishiwaki et al. | 29/890.1 |
| 5,290,992 A | 3/1994 | Lin et al. | 219/121.74 |
| 5,362,940 A | 11/1994 | MacDonald et al. | 219/121.68 |
| 5,367,143 A | 11/1994 | White, Jr. | 219/121.68 |
| 5,373,137 A | 12/1994 | McLaughlin | 219/121.68 |
| 5,406,042 A | 4/1995 | Engelfriet et al. | 219/121.68 |
| 5,425,045 A | 6/1995 | Hamatani | 372/101 |
| 5,430,816 A | 7/1995 | Furuya et al. | 385/33 |
| 5,463,200 A | 10/1995 | James et al. | 219/121.68 |
| 5,498,851 A | 3/1996 | Hayashi et al. | 219/121.7 |
| 5,569,238 A * | 10/1996 | Shei et al. | 606/4 |
| 5,676,866 A | 10/1997 | in den Bäumen et al. | 219/121.77 |

FOREIGN PATENT DOCUMENTS

| | | |
|---|---|---|
| EP | 0 309 146 | 3/1989 |
| EP | 0 419 069 A2 | 3/1991 |
| EP | 0 454 152 A2 | 10/1991 |
| EP | 0 488 033 A2 | 6/1992 |
| EP | 0 549 357 A1 | 6/1993 |
| EP | 0 656 261 | 6/1995 |
| EP | 0 683 007 A1 | 11/1995 |
| EP | 0 706 072 A2 | 4/1996 |
| EP | 0 719 644 A2 | 7/1996 |
| EP | 0 720 035 A2 | 7/1996 |
| EP | 0 786 305 A1 | 7/1997 |
| EP | 0 807 484 A1 | 11/1997 |
| GB | 2 262 253 A * | 6/1993 |
| GB | 2 262 253 | 6/1996 |
| JP | 57181873 A | 11/1982 |
| JP | 61023592 A | 2/1986 |
| JP | 62002540 A | 1/1987 |
| JP | 62115718 A | 5/1987 |
| JP | 62115719 A | 5/1987 |
| JP | 1-313196 A | 12/1989 |
| JP | 2-17325 | 2/1990 |
| JP | 03-060887 | 3/1991 |
| WO | WO 86/02301 | 4/1986 |
| WO | WO 93/15911 | 8/1993 |
| WO | WO 94/01240 | 1/1994 |
| WO | WO 94/29069 | 12/1994 |

* cited by examiner

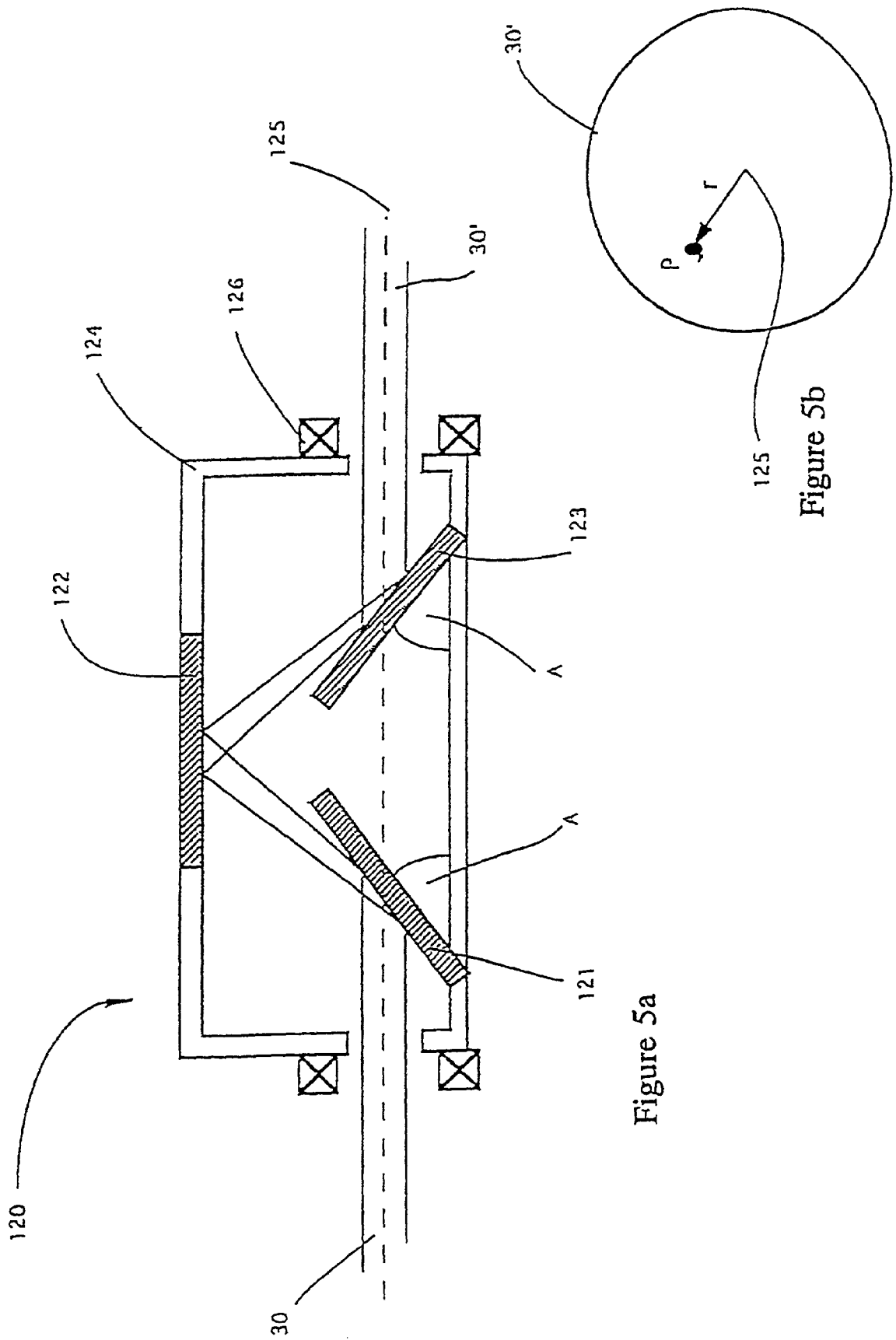

METHOD OF AND APPARATUS FOR FORMING NOZZLES

CROSS-REFERENCE TO RELATED APPLICATIONS

This is a division of U.S. application Ser. No. 09/096,316 filed Jun. 11, 1998, now U.S. Pat. No 6,228,311 which is a continuation of International Application No. PCT/GB97/00126 filed Jan. 16, 1997, the respective disclosures of which are incorporated herein by reference.

The present invention relates to methods and apparatus for forming a nozzle in a nozzle plate for an ink jet printhead, the nozzle having a nozzle inlet and a nozzle outlet in respective opposite faces of said nozzle plate.

WO93/15911 concerns methods of forming nozzles in a nozzle plate for an inkjet printhead utilising a high energy beam, in particular the ablation of nozzles in a polymer nozzle plate using an excimer laser. By means of a mask having a single aperture, a high energy beam is shaped prior to being directed by a converging lens onto the surface of a nozzle plate where a nozzle is formed.

WO93/15911 recommends increasing the divergence of the beam incident into the aperture of the mask by passing the beam through a layer such as a ground or etched surface or a thin film containing a medium having suitable light-scattering properties such as a colloid or opalescent material. Such a layer may be placed against a convergent lens which is itself located upstream of the mask for the purpose of focusing the beam into the aperture.

The divergence of the beam will determine the angle of taper of the nozzle. Furthermore, a second mask can be used to reduce the angle of divergence in one plane of the beam relative to another (both planes containing the beam axis), thereby to obtain a nozzle having a greater nozzle taper in one plane than in another. This will result in a nozzle inlet that is larger in one direction than in another direction perpendicular thereto —WO93/15911 points out that this advantageously allows the nozzle ink inlet to match the (generally rectangular) shape of an ink channel in the printhead with which the nozzle will communicate, whilst allowing the nozzle outlet to remain preferably circular.

The present invention has as its objective improvements to the processes described in the aforementioned WO93/15911, in particular to the manner in which the nozzle taper and the shape of the nozzle inlet and outlet are controlled.

According to a first aspect, the present invention comprises the method of forming a nozzle in a nozzle plate for an ink jet printhead, the nozzle having a nozzle inlet and a nozzle outlet in respective opposite faces of said nozzle plate, the method comprising the steps of:

directing a high energy beam towards said nozzle plate; introducing divergence into said beam; thereafter directing said beam at a single aperture of a mask, thereby to shape said beam; and thereafter passing said beam through beam converging means prior to impingement on the face of said nozzle plate in which said nozzle outlet is formed, thereby to form a nozzle, the nozzle outlet being conjugate through said beam converging means with said single aperture; wherein the step of introducing divergence into said beam comprises splitting said beam into a number of sub-beams, each sub-beam having divergence, the origin of divergence of each sub-beam lying apart from the point at which the respective sub-beam is created by splitting; the sub-beams thereafter being passed through further beam converging means prior to being recombined and directed through said single aperture of a mask, wherein the dimensions of the section of said recombined beam directly prior to impinging the plane of said mask are substantially equal to the dimensions of the aperture in said mask.

The present invention includes the step of introducing divergence into said beam by splitting said beam into a number of sub-beams, each sub-beam having divergence, the origin of divergence of each sub-beam lying apart from the point at which the respective sub-beam is created by splitting, the sub-beams thereafter being passed through further beam converging means prior to being recombined. This arrangement allows substantially more accurate control of the angle of divergence of the beam than has been possible in prior art arrangements: as mentioned, WO93/15911 proposes increasing the divergence of the high energy beam by scattering the light using a ground or etched surface or a thin film containing a medium having suitable light-scattering properties. It has been recognised in the present invention that divergence can be obtained in a much more controlled manner by splitting the high energy beam into a number of sub-beams which are subsequently recombined. Furthermore, the beam is split such that each sub-beam has divergence having an origin at a point lying apart from the point at which the respective sub-beam is created by splitting. It will be appreciated that the divergence obtained in this manner—which may be achieved using a lens to create each sub-beam —will be subject to substantially less variation than is achieved using prior art methods based on scattering. It follows that less variation in the angle of divergence of the combined beam will result in less variation in the angle of taper of the manufactured nozzles—resulting in better ink ejection performance of the final inkjet printhead.

Furthermore, by directing the recombined beam through a single aperture of a mask, with the dimensions of the section of the recombined beam directly prior to impinging the plane of said mask being substantially equal to the dimensions of the aperture in said mask, the high energy beam that finally impinges on the nozzle plate to form a nozzle does not have its divergence reduced by any significant amount by the mask. Consequently, the full range of beam divergence is available to form nozzle bores having a correspondingly high taper angle from outlet to inlet.

According to a second aspect, the invention comprises the method of forming a nozzle in a nozzle plate for an ink jet printhead, the nozzle having a nozzle inlet and a nozzle outlet in respective opposite faces of said nozzle plate, the method comprising the steps of:

directing a high energy beam towards said nozzle plate; introducing divergence into said beam; and thereafter passing said beam through beam converging means prior to impingement on said nozzle plate, thereby to form a nozzle; wherein the step of introducing divergence into said beam comprises passing said beam through an array of optical elements to create an array of sub-beams, each sub-beam having divergence, the origin of the divergence of each sub-beam lying apart from the respective optical element; said array of sub-beams being thereafter directed towards first reflecting means for reflecting towards second reflecting means, said second reflecting means reflecting towards said nozzle plate; the positional relationship of said first and second reflecting means being such that a parallel beam impinging on said first reflecting means is reflected from said second reflecting means as a converging beam; the arrangement of said optical elements being such that all incoming sub-beams are directed by said first reflecting means towards said second reflecting means, thereafter to impinge on said nozzle plate.

This second aspect of the invention also utilises the concept of splitting (by means of an array of optical elements) a high energy beam into sub-beams having an origin of divergence lying apart from the plane of beam splitting and thereafter recombining the sub-beams through beam converging means. It therefore shares with the first aspect of the invention the advantage that the resulting angle of the beam can be accurately controlled.

In addition, the high energy beam is directed at the nozzle plate by means of first and second reflecting means and the optical elements in said array—e.g. lenses—are arranged such that all sub-beams impinging on the first reflecting means are directed towards the second reflecting means and not elsewhere e.g. back towards the array offenses. This measure results in less wastage of the beam and furthermore avoids damage to other elements in the system by stray laser light. Such system elements may include lenses, turning mirrors and even the laser itself—located "upstream" of the first and second reflecting means.

A third aspect of the present invention comprises the method of forming a nozzle in a nozzle plate for an ink jet printhead, the nozzle having a nozzle inlet and a nozzle outlet in respective opposite faces of said nozzle plate and a nozzle bore having an axis; the method comprising the steps of:

directing a high energy beam towards said nozzle plate; introducing divergence into said beam; and thereafter passing said beam through beam converging means prior to impingement on said nozzle plate, thereby to form a nozzle; wherein the step of introducing divergence into said beam comprises passing said beam through an array of optical elements to create an array of sub-beams, each sub-beam having divergence, the origin of divergence of each sub-beam lying apart from the respective optical element; said array of sub-beams having a greater width in a first direction than in a second direction orthogonal to said first direction, said first and second directions lying perpendicular to the direction of impingement of said beam on said array; thereafter passing said array of sub-beams through beam converging means prior to their impingement on the nozzle plate, thereby to form said nozzle; the angle of taper of the nozzle bore relative to the nozzle axis in a direction corresponding to said first direction being greater than the angle of taper of the nozzle bore in a direction corresponding to said second direction.

The third aspect of the invention again shares the concept of splitting a high energy beam into sub-beams having an origin of divergence lying apart from the plane of beam splitting and thereafter recombining the sub-beams through beam converging means. This third aspect also comprises an array of optical elements having a greater width in a first direction than in a second direction orthogonal to said first direction, which allows the production in a simple and accurate manner of nozzles having a greater taper angle in one direction than in another. This in turn yields a nozzle inlet having a greater dimension in one direction than in the direction orthogonal thereto—such a configuration may be particularly desirable where the ink supply channel to which the nozzle is attached is also non-axi-symmetric.

A fourth aspect of the present invention comprises a method of forming a nozzle in a nozzle plate for an ink jet printhead, the nozzle having a nozzle inlet and a nozzle outlet in respective opposite faces of said nozzle plate, characterised by the steps of:

directing a high energy beam having a first axis extending in a first direction towards said nozzle plate; directing said beam at a first reflecting surface lying at an angle to said first direction, said surface being arranged so as to reflect said beam towards a second reflecting surface so arranged as to both invert said beam and direct said beam along an axis collinear with said first axis extending in a first direction; said first and second surfaces being fixedly located relative to one another, thereby to form an assembly, and rotating said assembly about said first axis; said beam thereafter impinging on said nozzle plate, thereby to form a nozzle.

As explained in greater detail in the description that follows, this technique results in a high energy beam having a uniform intensity at a given radius and, when applied to the manufacture of nozzles, yields nozzle dimensions lying within tighter tolerance bands and consequently a better quality nozzle.

A method of forming a nozzle in a nozzle plate for an inkjet printhead, the nozzle having a nozzle inlet and a nozzle outlet in respective opposite faces of the nozzle plate according to a fifth aspect of the invention includes the step of directing a high energy beam at the face of the nozzle plate in which said nozzle outlet is to be formed, whereby the power of said high energy beam is initially held low and is increased with increasing depth of the nozzle formed in said nozzle plate. As is also explained in greater detail in the description hereafter, this technique gives a higher quality nozzle outlet, better internal finish and a more accurate nozzle shape.

The present invention also comprises apparatus for carrying out the methods outlined above.

The invention will now be described by way of example by reference to the following diagrams, of which:

FIG. 4a is a perspective view of yet another embodiment of the present invention; FIG. 4b is a sectional view through the mirror arrangement 82, 84 of FIG. 4a;

FIG. 5a is a sectional view through a beam conditioning device according to the present invention; FIG. 5b is a schematic diagram of the beam section following conditioning;

Figure 1:
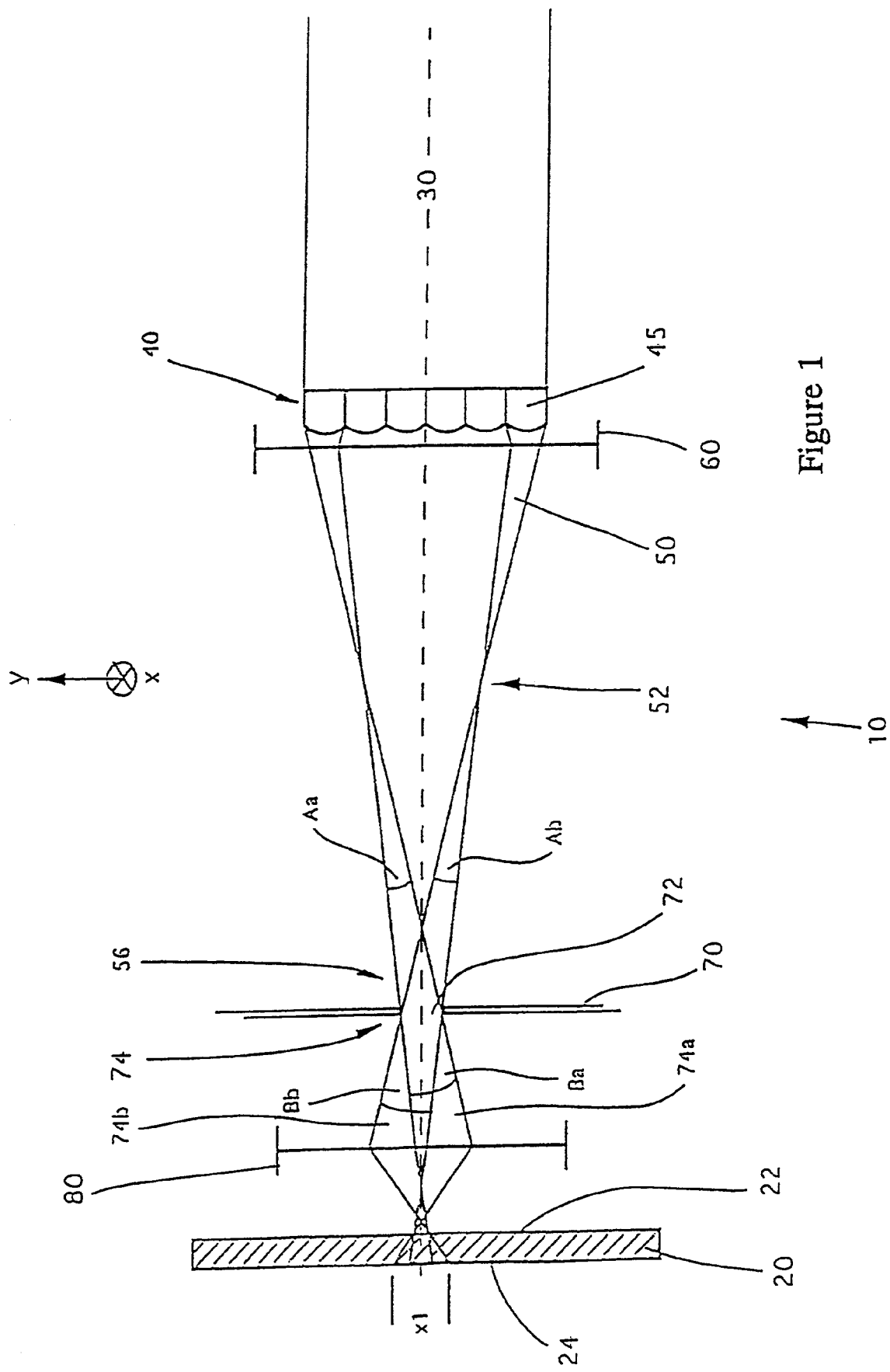
FIG. 1 is a schematic illustration of a first embodiment of the present invention when viewed in a direction X.

FIG. 1 shows an embodiment of apparatus for carrying out the method according to one aspect of the present invention. Reference FIG. 20 designates a nozzle plate in which a nozzle is to be formed. The apparatus 10 comprises a source of a high energy beam such as a UV excimer laser (not shown) which generates a high energy beam 30 which, after having undergone various beam conditioning processes (e.g. collimating, shaping of the beam to fit further optical devices located "downstream"), is directed at an array 40 of optical elements which, in the present example, are cylindrical lenses 45. Such an array of lenses is commonly known as a flyseye lens.

The array 40 splits the beam into a corresponding array of sub-beams 50, each sub-beam having a focal point 52. As will be clear from the figure, after passing through the focal point 52, each sub-beam will be divergent with a divergence angle (Aa, Ab in FIG 1) and an origin of divergence at the focal point 52 of the respective lens 45 (note that for the sake of clarity, only outlines of those beams issuing from the outermost lenses of the array 40 have been shown; the beams from lenses nearer the centre of the array will fall within these extremes). It will be appreciated that range Aa, Ab of angles of divergence of each sub-beam emanating from the lenses 45 will be much narrower than the range that would be expected from prior art techniques utilising scattering. As shown in FIG. 1, the array of sub-beams issuing from the array 40 is passed through a converging lens 60, thereby to recombine the sub-beams at 56.

The recombined beam is directed at the aperture 72 of a mask 70, and to this end, the mask is preferably located at a distance from the lens 60 equal to the focal length of the lens.

Although in the example shown the focal point of the sub-beams 52 is located downstream of the array 40, any arrangement where the focal point of the sub-beams is located before the subsequent mask 70 will suffice: the lenses in the array 40 may for example diverge the incoming beam such that the origin of divergence is located "upstream" of the array 40, for example. The strength of the subsequent converging lens 60 may be chosen such that the sub-beams still recombine.

As mentioned above and shown in FIGS. 1-3, the dimensions of the section of the recombined beam directly prior to impinging the plane of the mask are substantially equal to the dimensions of the aperture in said mask. The recombined beam passing through the aperture (and indicated by 74 in FIG. 1) is subsequently guided by means of a further convergent lens 80 onto the surface 22 of the nozzle plate 20 where it ablates the material of the nozzle plate, thereby forming a nozzle. The strength of the lens 80 and the relative positions of the nozzle plate 20 and mask 70 are chosen such that an image of the mask aperture 72, illuminated by the beam 56, is projected onto the surface 22 of the nozzle plate. The nozzle section at the surface 22 and the mask aperture 72 can be seen to be conjugate through the lens 80 and consequently, by changing the size of the aperture 72 the size of the hole formed in the surface 22 (which forms the outlet orifice of the resulting nozzle) can be altered.

As is evident from the figure, the sub-beams 74a, 74b making up beam 74 strike the surface 22 of the nozzle plate at an angle, with the result that the section of the hole ablated by the beams increases with the depth of the ablated hole. The resulting nozzle is therefore tapered, with the nozzle section at the "front" surface 22 of the nozzle plate 20 being determined by the mask aperture 72 and the section at the "rear" surface 24 being determined by both the aperture 72 and the angle of the incident beams.

The angle of the incident beams is determined both by the strength of the lens 80 and by the angles of divergence present in the beam 74 passing through the aperture 72. The former preferably lies in the range: $0.4 \leq$ numerical aperture $\leq 0.65$ (corresponding to magnification of ×25 and ×52 respectively). The latter is determined by the strength of the lenses in the array 40 and also the geometry of the array. As already mentioned, the features whereby divergence is introduced into the beam by splitting it into a number of sub-beams, each sub-beam having divergence, allows the angle of divergence of the nozzle forming beam to be controlled that much more accurately. This in turn allows accurate control of the three-dimensional shape of the resulting nozzle, in particular its taper angle and the sections at the nozzle outlet and inlet.

Ensuring that the dimensions of the section of the recombined beam directly prior to impinging the plane of the mask are substantially equal to the dimensions of the aperture in the mask, as mentioned above, ensures that the high energy beam that finally impinges on the nozzle plate to form a nozzle does not suffer any significant reduction in its divergence—which might result in a corresponding reduction in nozzle taper. In practice, the section of the recombined beam will have slightly greater dimensions than the mask aperture: were the recombined beam to be smaller than the mask aperture, then the mask would no longer play any masking function and the image projected onto the front of the nozzle plate being not that of the aperture but that of the flyseye lens. It will also be evident from FIG. 1 that the matching between the dimensions of the aperture and the recombined beam also means that the divergence angles (Ba, Bb in FIG. 1) of the sub-beams 74a, 74b making up the recombined beam 74 at a position downstream of the mask 70 correspond to the divergence angles Aa and Ab of the sub-beams 50 upstream of the mask.

Figure 2:
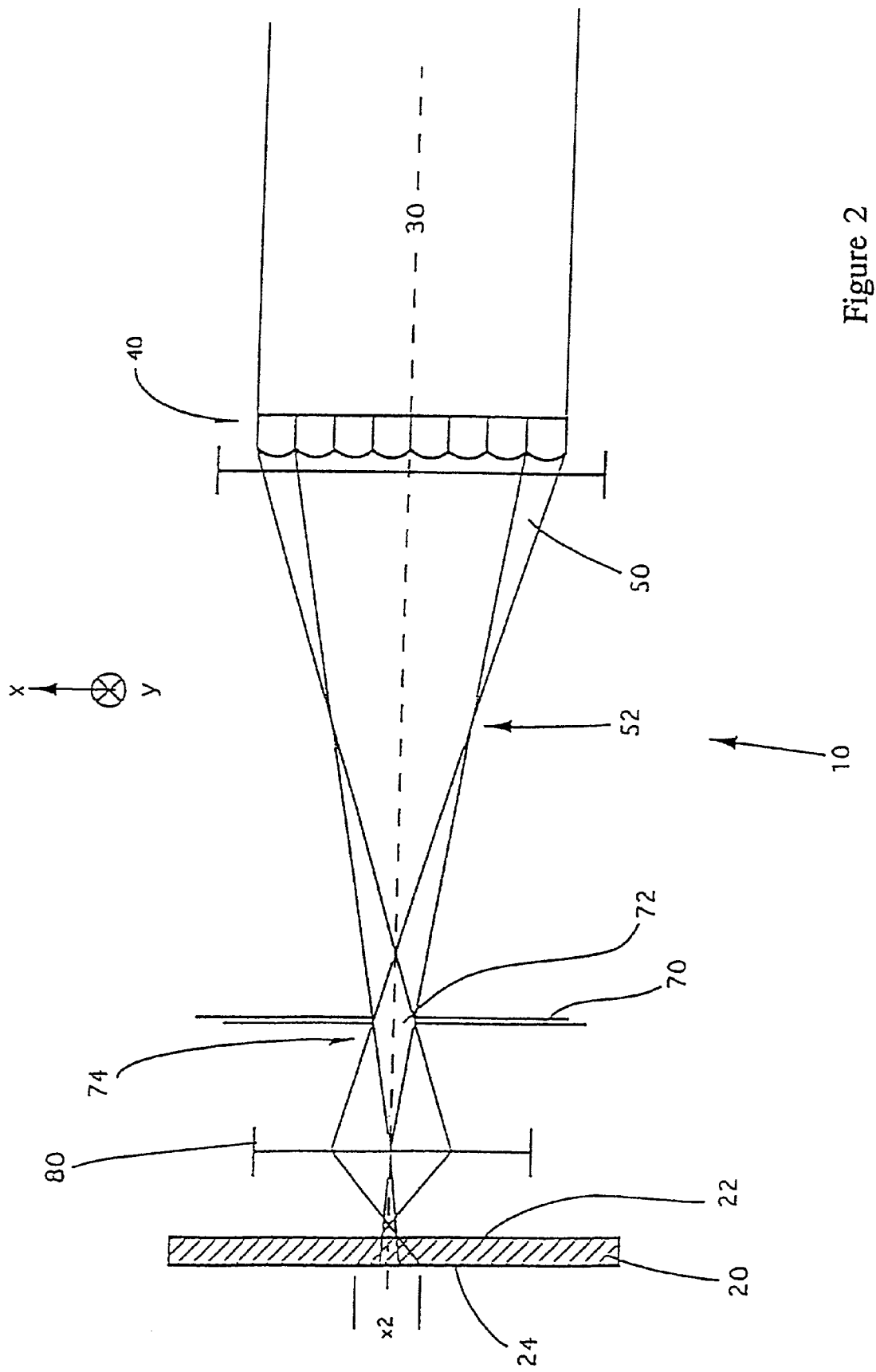
FIG. 2 is a view of the apparatus of FIG. 1 in a direction Y orthogonal to direction X.

FIG. 2 is a view in a direction Y orthogonal to the direction of viewing X of FIG. 1 and illustrates the case where the array 40 has a rectangular geometry, being wider in the X direction than in the Y direction. It can be seen that the angle of divergence of the beams leaving the aperture 72 is correspondingly greater than that shown in FIG. 1, as is the angle of taper of the nozzle in this direction and thus the dimension of the nozzle at the "rear" surface of the nozzle plate (indicated by x2 in FIG. 2 and greater than distance x1 in FIG. 1). The overall shape of the nozzle at the rear surface will be rectangular, in correspondence with the geometry of the array 40.

It should be noted that geometry of the array 40 can be altered either by rearranging the location of the lenses in the array or by blocking out some of the lenses of an existing array e.g. by means of a mask placed directly upstream of the array.

The individual lenses making up the array 40 each contribute a bundle of diverging beams, each bundle having a section which may be circular or some other shape depending whether the optical elements making up the array are lenses, prisms or otherwise having axi-symmetric or some other shape respectively. Whilst this feature is instrumental in obtaining many of the advantages described in the present application, it nevertheless results in the aforementioned section of the nozzle at the "rear" surface 24 having a corrugated outline. However, where this "rear" section is circular, the corrugations can be avoided by rotating the flyseye lens about its polar axis during the course of the nozzle forming process.

Figure 3:
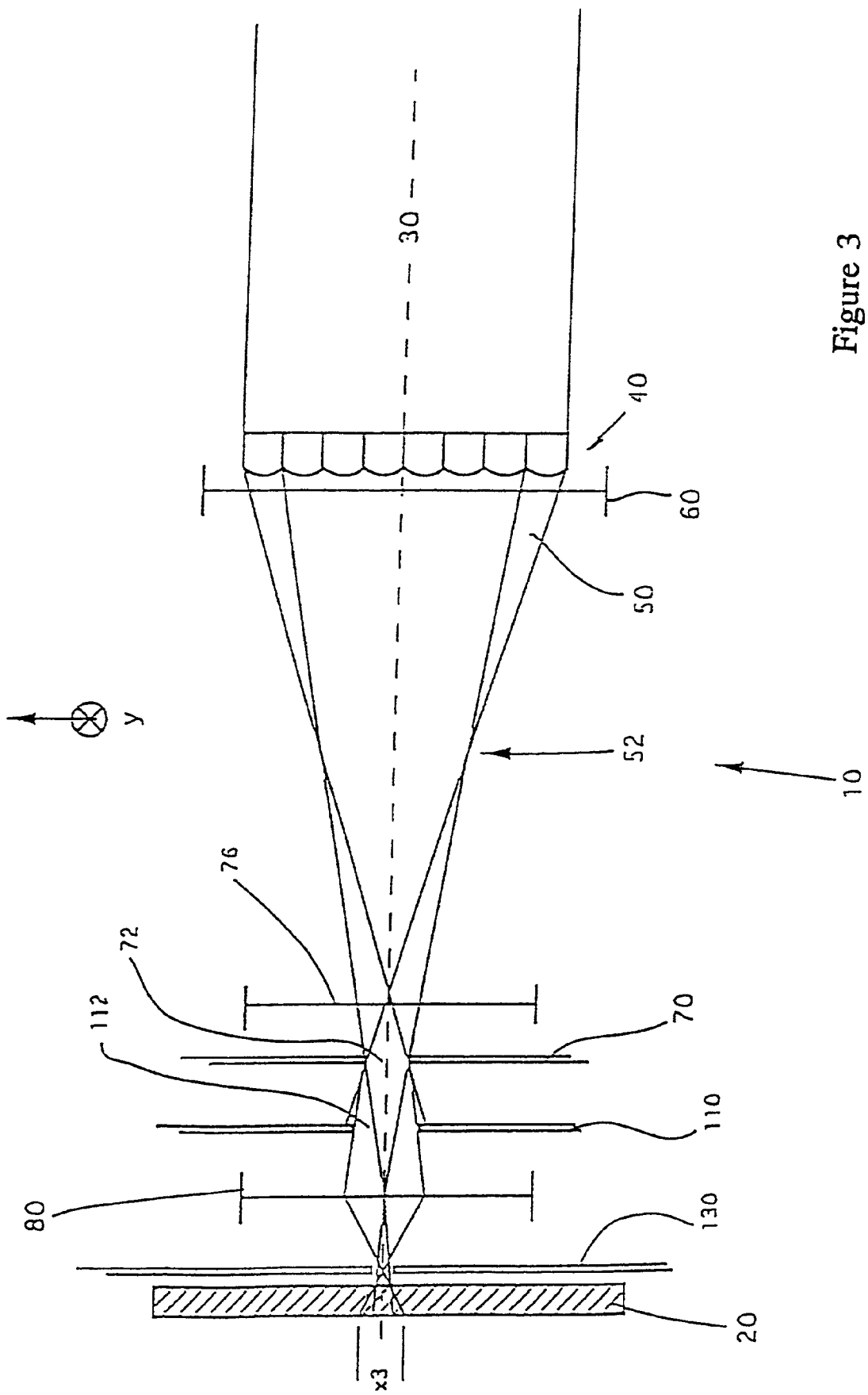
FIG. 3 is a further embodiment of the present invention.

An alternative method of influencing the angle of the incident beams to control nozzle taper is to interpose a further mask between the mask 70 and the lens 80. Such an arrangement is illustrated in FIG. 3, the further mask being designated by reference FIG. 110, the corresponding aperture by 112. It is evident that the mask 110 blocks out those beams passing through the aperture 72 which have divergence greater than a certain angle, resulting in a nozzle with reduced inlet size x3. The dimensions and shape of the further aperture can be varied to control the dimensions and shape of the shape of the nozzle at the rear surface, as is known from the aforementioned WO-A-93/15911.

Advantageously, a further converging ("field") lens can be located directly upstream of the mask aperture 72, as indicated by reference figure 76 in FIG. 3. Movement of this lens in its own plane, i.e. parallel to the mask 70, allows the combined diverging sub-beams to be aligned with the mask aperture. Nonalignment results in one side of the beam being obscured more than another which in turn results in one side of the nozzle having a lesser taper than the other. Such asymmetry is undesirable in a nozzle.

According to another preferred embodiment of the invention, there is located upstream of the flyseye lens a variable beam attenuator (not shown in the figures). Such devices are generally known in the art and for this reason their construction will not be discussed here in any detail. In the present invention, however, such a device is advantageously employed to control the power of the high energy beam during the nozzle formation process: at the beginning of the nozzle formation process, laser power is held low to minimise damage to the nozzle outlet from exhaust products of the ablation process. Power is then increased as the depth (and section) of the forming nozzle increases. Towards the end of nozzle formation, high laser power is employed to give the nozzle a good internal finish and to ensure faithful reproduction of the shape of the nozzle forming beam. The initial rate of increase of laser power is preferably low, even zero, increasing once the forming nozzle has attained a certain depth. Measurement of the depth of the forming nozzle is not necessary: the power of the laser may be controlled as a function of time, the time necessary for a given process to reach a certain depth being readily determinable by experiment.

Figures 4A, 4B:
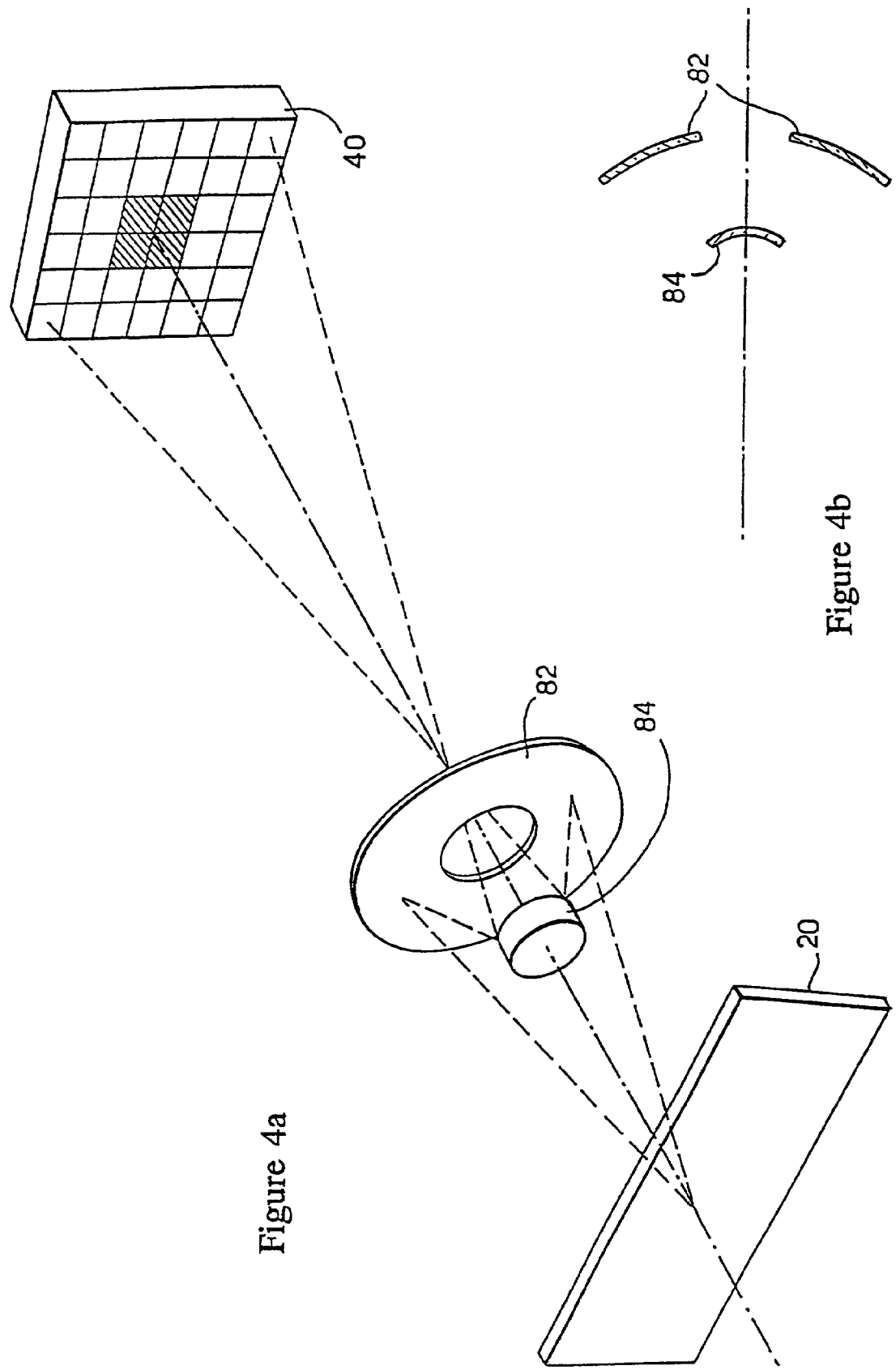

It will be apparent that many kinds of lens may be used for the convergent lenses 60, 74 and 80 referred to above. However, it has been found particularly advantageous to use for the lens 80 a lens comprising two mirrors of the type generally known as a Cassegrain reflective lens. An example is shown schematically in FIG. 4a, the mask 70 and convergent lens 60 having been omitted for the sake of clarity. FIG. 4b shows the mirrors 82, 84 in section, from which is clear that the mirrors are axi-symmetric, having reflective surfaces that are surfaces of revolution. Such a lens arrangement has a high magnification (equivalent to a high numerical aperture value), allowing a high degree of angling of the incident beams relative to the axis of the lens (equivalent to a lower angle of incidence between beam and the surface 22 of the nozzle plate 20) and the formation of nozzles of significant taper. Such lenses also exhibit low aberration since the beam does not pass through any lens material but is simply reflected from one surface to another. Finally, it will be appreciated from FIG. 4 that the reflecting surfaces of such an arrangement are generally located away from the surface of the nozzle plate and are thus less likely to be contaminated by debris generated during the nozzle formation process.

The flyseye lens may advantageously be adapted for use with a lens of the type described above by rendering the central lenses of the array inoperative e.g. by removing the lenses or blocking them out as shown in FIG. 4. Blocking may be achieved by means of a mask located directly upstream or downstream. The sub-beams from these central lenses might otherwise reflect back into and damage optical elements (even the laser) located upstream. In the embodiment shown, utilising an 6×6 array of lenses, the centre four lenses of the array are masked out.

FIG. 5a shows apparatus that is particularly suited for use in the manufacture of nozzles for inkjet printheads and in particular for use with arrangements described above. Located upstream of the flyseye lens, the device 120 comprises an assembly of three reflecting surfaces 121, 122, 123 held fixed relative to one another by means of a housing 124, the assembly being rotatable together about an axis 125, for example in bearings 126 by means of a motor (not shown). The incoming beam 30 is directed along the axis 125, strikes surface 121 and is reflected to surface 122 and back to surface 123 whence it leaves the device, again along the axis 125. In the example shown, the reflecting surfaces 121,122,123 are high reflectance dielectric mirrors.

Figure 6A:
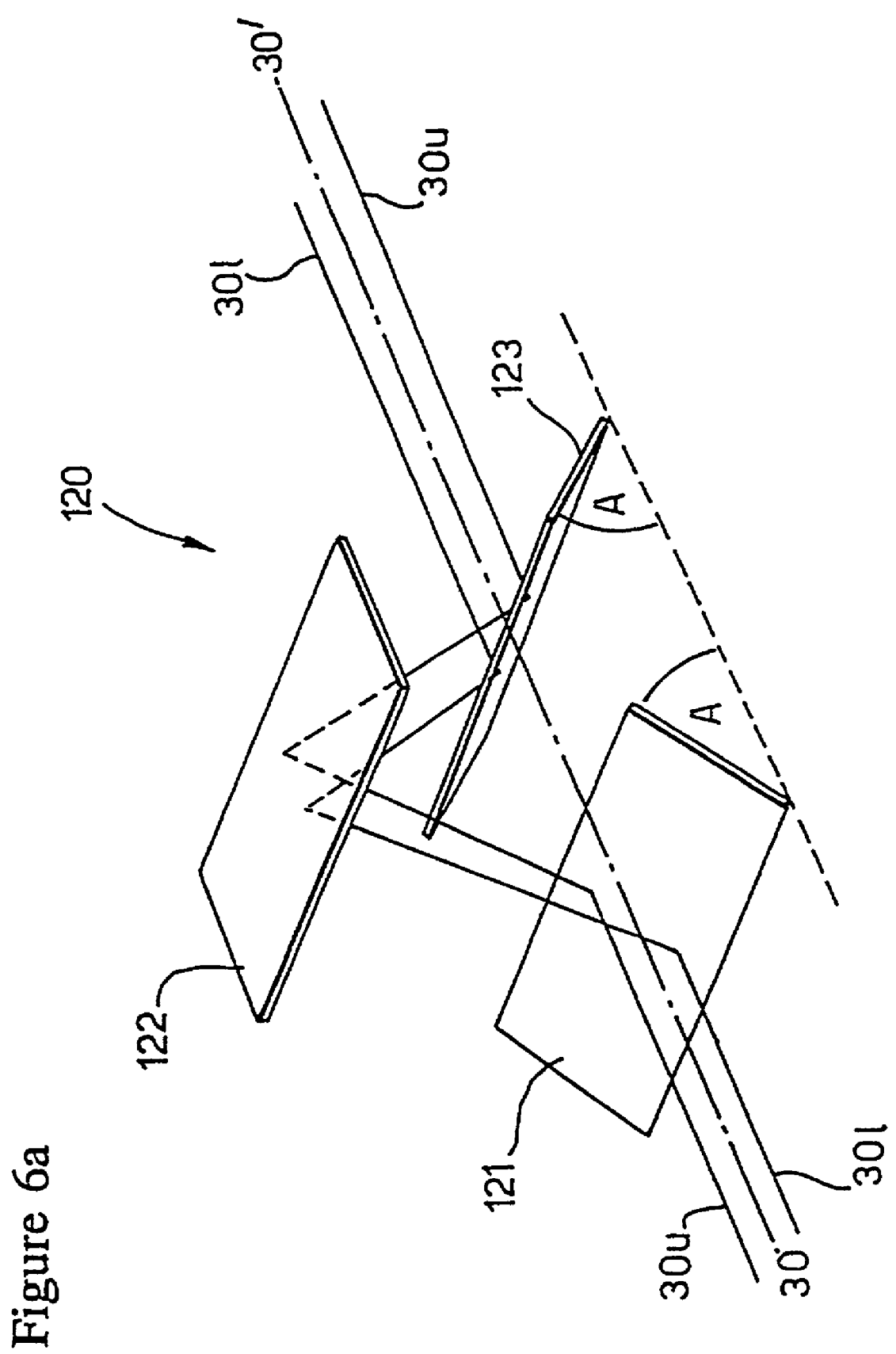
FIGS. 6a and 6b illustrate the functioning of the device of FIG. 5a at rotation angles of 0° and 90° respectively.
Figure 6B:
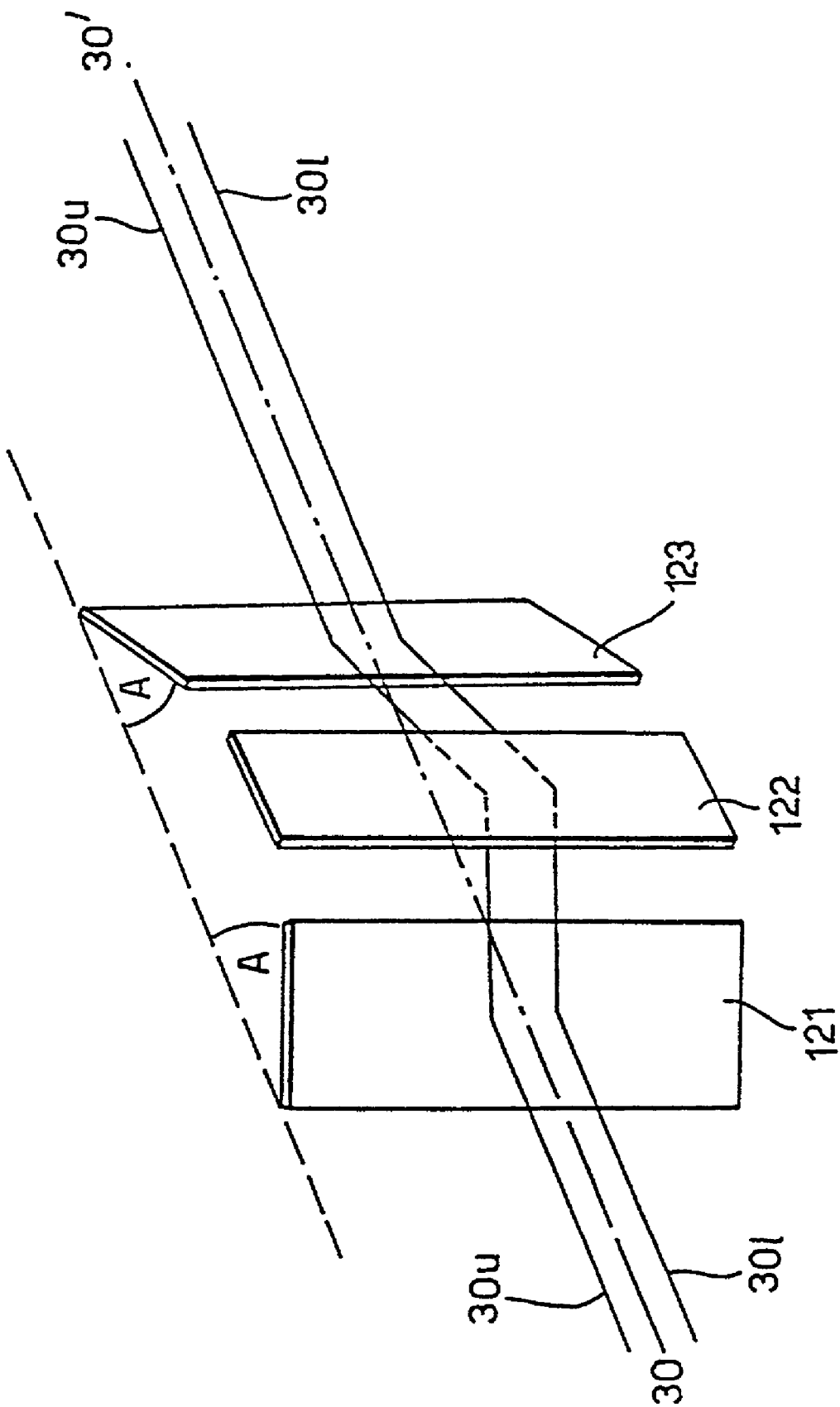

The paths of top and bottom sections (30u, 30l) of the beam at different rotational angles of the device 120 are illustrated in FIGS. 6a and 6b. When the device is at 0° rotation, as shown in FIG. 6a, sections 30u and 30l of the beam strike the reflecting surface 121 at different locations along the axis 125 with the result that, following further reflection by surfaces 122 and 123, the initially top and bottom sections 30u and 30l exit the device at the bottom and top of the beam respectively. However, with the device oriented at 90° as shown in FIG. 6b, both bottom and top sections of the beam strike the surface 121 at the same axial location and no inversion of beam sections 30u and 30l occurs. At 180° rotation of the device (not shown), sections 30u and 30l will again strike surface 121 at different locations along the beam axis with the result that inversion will take place.

It will therefore be evident that apparatus located downstream of the rotating device 120 described above will be exposed to a beam 30' having an intensity at a given point P at a radius r from the beam axis that varies at a frequency corresponding to twice the angular velocity of the housing 124 (see FIG. 5b). Were the incoming beam 30 to be totally homogeneous, at least at a given radius r from the beam axis, the point P would experience no change in beam intensity. In practice, however, the beam 30 generated by the laser is not homogeneous, even at a given radius, with the result that the point P will experience a periodically varying beam intensity. Such a varying intensity does nevertheless have the virtue of having the same average value for all points irradiated by the beam which are located at a radius r from the beam axis. Since beam intensity at a point translates into rate of material removal at the nozzle plate, use of the device described above results in nozzles that are more uniform (at least at a given nozzle radius) than would be obtained using a beam not subject to such conditioning.

The use of discrete reflecting surfaces 121, 122 and 123 is particularly appropriate in a device employing a high energy beam: these have the advantage of low aberration when used with high energy beams, as well having lower losses and being more robust than conventional lenses/prisms. In the example shown above, high reflectance dielectric mirrors are used.

It should be noted that other types of beam homogeniser, as are well known in the art, may be used in place of/in addition to the beam conditioning device just described.

A further imperfection in real-life optic systems is the presence of stray beams caused by imperfections in the optical elements making up the system: such stray beams, if allowed to hit the nozzle plate, may result in a nozzle that deviates from the ideal. This can be avoided by the use of a spatial filter, shown by way. of example in FIG. 3, and comprising a mask 130 placed just in front of the nozzle plate at the point where the beams cross prior to impinging on the nozzle plate. The aperture in the mask is chosen to pass the nozzle-forming beam yet exclude any stray beams failing outside of the nozzle-forming beam. The accuracy of the aperture is therefore crucial. Advantageously, the aperture can be formed by the insitu ablation of a mask blank using the same beam and optics subsequently used for nozzle ablation. The material of the mask blank should of course be chosen such that, unlike the nozzle plate material, it does not ablate significantly under the action of stray beams.

A further process step for increasing the quality of the manufactured nozzles is to carry out the ablation process in an atmosphere of Helium or Oxygen. Accordingly, the nozzle plate is placed in a chamber supplied with the appropriate gas and having a window through which the beam is transmitted. Components such as the spatial filter which lie very close to the nozzle plate may also be accommodated in the chamber. Helium used in the chamber acts as a cooling medium, condensing the ablation products before they have the opportunity to damage any other part of the nozzle plate, whilst oxygen used in the chamber reacts with the ablation products, turning them to gas. Both methods result in a cleaner end product The present application is directed in the main to methods of manufacturing nozzles in a nozzle plate of an inkjet printhead. Although only a single nozzle is shown in the figures, most designs of printhead will have a substantial number of nozzles e.g. 64 or 128. Manufacturing time can obviously be reduced by forming more that one nozzle at a time, these being either nozzles in the same printhead or nozzles belonging to separate printheads. However, full optical systems of the type shown in FIGS. 1 and 2 are not necessarily required for each nozzle to be formed simultaneously: for example, the beam from a single high energy beam source may be used to feed a number of individual optical systems. Furthermore, only a single variable beam attenuator is necessary if it used to control the power of the single beam prior to splitting. Alternatively, the beam splitting optics may be inserted between the mask 70 and the convergent lens 80, thus reducing duplication to the convergent lens 80 and any other elements (spatial filter etc.) that might be required downstream thereof.

As regards the printhead itself, the nozzle plate 22 is made of a material, e.g. polyimide, polycarbonate, polyester, polyetheretherketone or acrylic, that will ablate when irradiated by light from a UV excimer laser. Whilst the process of ablation—which is well known in the context of inkjet printheads as being capable of forming accurate nozzles—is to be preferred, the present invention is not intended to be restricted to this type of high energy beam. Radiation from other types of laser or other sources may be employed as a high energy beam.

It will be appreciated from the foregoing description that the present invention is particularly suited to forming tapered nozzles. In use, the broad section of the tapered nozzle serves as the nozzle ink inlet and is connected to an ink channel of the printhead whilst the narrow section of the nozzle serves as the droplet ejection outlet. The Ofront" surface of the nozzle plate in which the outlet is formed may have a low energy, non-wetting coating to prevent ink build-up around the nozzles. In the case where this coating is applied to the nozzle plate before nozzle formation, the beam must break through this coating as well as the nozzle plate material.

Nozzles may be formed in the nozzle plate either before or after attachment of the nozzle plate to the printhead (as is known in the art, see for example the aforementioned WO93/15911). In both cases, the location of the nozzle relative to the respective channel is important and is facilitated by means for manipulating the nozzle plate/printhead relative to the optical system prior to nozzle formation.

The invention claimed is:

1. Method of forming a nozzle in a nozzle plate for an ink jet printhead, the nozzle having a nozzle inlet and a nozzle outlet in respective opposite faces of said nozzle plate, the method comprising the steps of:

directing a high energy beam having a first axis extending in a first direction towards said nozzle plate; introducing divergence into said beam; thereafter directing said beam at a single aperture of a mask, thereby to shape said beam; thereafter passing said beam through beam converging means, and subsequently directing said beam at said nozzle plate such that said beam first impinges upon face of said nozzle plate in which said nozzle outlet is formed, thereby to form a nozzle, the nozzle outlet being conjugate through said beam converging means with said single aperture;

wherein the step of introducing divergence into said beam comprises splitting said beam into a number of sub-beams, each sub-beam having divergence, the origin of divergence of each sub-beam lying apart from the point at which the respective sub-beam is created by splitting; thereafter passing the sub-beams through further beam converging means prior to recombining and directing the sub-beams at said single aperture of said mask, wherein dimensions of a section of said recombined beam directly prior to impinging a plane of said mask are substantially equal to dimensions of said single aperture of said mask; and, wherein said high energy beam is directed at a first beam reflecting surface lying at an angle to said first direction, said first surface being arranged so as to reflect said beam toward two additional beam reflecting surfaces, said first, second and third beam reflecting surfaces being so arranged as to both invert said beam and direct said beam along an axis collinear with said first axis extending in said first direction; said first planar reflecting surface and said at least two additional beam reflecting surfaces being fixed relative to one another, thereby to form an assembly, and rotating said assembly about said first axis, said beam thereafter impinging on said nozzle plate, thereby to form said nozzle wherein said nozzle inlet is larger in diameter than said nozzle outlet.

2. Method according to claim 1, wherein the power of said high energy beam is initially held low and is increased with increasing depth of the nozzle formed in said nozzle plate.

3. Method according to claim 1, wherein a further mask is interposed between the mask and the beam converging means.

4. Method of forming a nozzle in a nozzle plate for an ink jet printhead, the nozzle having a nozzle inlet and a nozzle outlet in respective opposite faces of said nozzle plate, the method comprising the steps of:

directing a high energy beam having a first axis extending in a first direction towards said nozzle plate; introducing divergence into said beam; thereafter directing said beam at a single aperture of a mask, thereby to shape said beam; thereafter passing said beam through beam converging means, and subsequently directing said beam at said nozzle plate such that said beam first impinges upon the face of said nozzle plate in which said nozzle outlet is formed, thereby to form a nozzle, the nozzle outlet being conjugate through said beam converging means with said single aperture;

wherein the step of introducing divergence into said beam comprises splitting said beam into a number of sub-beams, each sub-beam having divergence, the origin of divergence of each sub-beam lying apart from the point at which the respective sub-beam is created by splitting; thereafter passing the sub-beams through further beam converging means prior to recombining and directing the sub-beams at said single aperture of said mask, wherein dimensions of a section of said recombined beam directly prior to impinging a plane of said mask are substantially equal to dimensions of said single aperture of said mask;

wherein said high energy beam is directed at a first planar reflecting surface lying at an angle to said first direction, said first surface being arranged so as to reflect said beam toward a second beam reflecting surface and a third beam reflecting surface so arranged as to both invert said beam and direct said beam along an axis collinear with said first axis extending in said first direction; said first planar reflecting surface and said second and third beam reflecting surfaces being fixed relative to one another, thereby to form an assembly, and rotating said assembly about said first axis, said beam thereafter impinging on said nozzle plate, thereby to form said nozzle wherein said nozzle inlet is larger in diameter than said nozzle outlet; and wherein the power of said high energy beam is initially held low and is increased with increasing depth of the nozzle formed in said nozzle plate.

5. Method according to claim 4, wherein a further mask is interposed between the mask and the beam converging means.

* * * * *